United States Patent [19]
Minutillo

[11] Patent Number: 5,737,903
[45] Date of Patent: Apr. 14, 1998

[54] NEWSPAPER RECYCLING DISPOSAL SYSTEM

[76] Inventor: Thomas Minutillo, 1537-75 St., Brooklyn, N.Y. 11228

[21] Appl. No.: 816,959

[22] Filed: Dec. 23, 1996

[51] Int. Cl.⁶ .................................. B65B 67/04
[52] U.S. Cl. ............... 53/475; 53/390; 53/459; 53/260; 53/575; 220/404; 220/908
[58] Field of Search .................. 220/403, 404, 220/908, 909; 53/244, 255, 260, 390, 447, 459, 475, 540, 570, 575, 576

[56] References Cited

U.S. PATENT DOCUMENTS

| | | | |
|---|---|---|---|
| D. 247,207 | 2/1978 | Moynihan . | |
| 3,734,340 | 5/1973 | Ippolito et al. | 220/404 X |
| 3,822,524 | 7/1974 | Jerpbak | 53/390 X |
| 3,915,329 | 10/1975 | Zaks | 220/404 |
| 4,014,157 | 3/1977 | Pearce | 53/390 X |
| 4,280,315 | 7/1981 | Von Hapsburg | 53/390 X |
| 4,457,483 | 7/1984 | Gagne | 220/908 X |
| 4,749,011 | 6/1988 | Rylander | 53/390 X |
| 4,890,652 | 1/1990 | Hoerner | 53/390 X |
| 4,979,547 | 12/1990 | Hoerner | 53/390 X |
| 5,022,316 | 6/1991 | Hellwig . | |
| 5,042,371 | 8/1991 | Katz . | |
| 5,072,852 | 12/1991 | Smith et al. | 220/909 X |
| 5,129,526 | 7/1992 | Craft, Jr. et al. . | |
| 5,154,038 | 10/1992 | Capaci | 53/390 X |
| 5,282,545 | 2/1994 | White . . | |
| 5,388,687 | 2/1995 | Philip . | |

*Primary Examiner*—Daniel Moon
*Attorney, Agent, or Firm*—Richard L. Miller, P.E.

[57] ABSTRACT

A newspaper recycling disposal system that stacks and bundles used newspapers while eliminating need for using ties to tie the used newspapers to form bundles wherein the bundles are compatible with pulping processes used for recycling the used newspapers at paper mills, by virtue of eliminating the ties that are incompatible, and thereby eliminating contaminates which require labor and time to remove which reduces the value of the used newspapers that have been bundled. The system includes a generally circular-cylindrically-shaped container, a replaceable and circular-cylindrically-shaped rigid sleeve, and a circular-cylindrically-shaped mesh bag. The replaceable and circular-cylindrically-shaped rigid sleeve sits replaceably in the generally circular-cylindrically-shaped container and has the used newspapers stackable therein and has an open and circular-shaped top that forms an open mouth that receives the used newspapers. And, the circular-cylindrically-shaped mesh bag has a circular-shaped and open top that forms a mouth that removably receives the replaceable and circular-cylindrically-shaped rigid sleeve and is manufactured of the material that is compatible with the pulping processes used for recycling the used newspapers at the paper mills wherein the circular-cylindrically-shaped mesh bag captures and bundles the used newspapers stacked in the replaceable and circular-cylindrically-shaped rigid sleeve when the replaceable and circular-cylindrically-shaped rigid sleeve is removed from both the generally circular-cylindrically-shaped container and the circular-cylindrically-shaped mesh bag.

17 Claims, 1 Drawing Sheet

NEWSPAPER RECYCLING DISPOSAL SYSTEM

BACKGROUND OF THE INVENTION

The present invention relates to a newspaper recycling disposal system. More particularly, the present invention relates to a newspaper recycling disposal system that stacks and bundles used newspapers with a weight while eliminating the need for using ties to tie the used newspapers to form a bundle wherein the bundle is compatible with pulping processes used for recycling the used newspapers at paper mills, by virtue of elimination of the ties that are incompatible, and thereby eliminating contaminates which require labor and time to remove which reduces the value of the used newspapers that have been bundled. The system includes a generally circular-cylindrically-shaped container, a replaceable and circular-cylindrically-shaped rigid sleeve, and a circular-cylindrically-shaped mesh bag. The replaceable and circular-cylindrically-shaped rigid sleeve sits replaceably in the generally circular-cylindrically-shaped container and has the used newspapers stackable therein and has an open and circular-shaped top that forms an open mouth that receives the used newspapers. And, the circular-cylindrically-shaped mesh bag has a circular-shaped bottom and a circular-shaped and open top that forms a mouth that removably receives the replaceable and circular-cylindrically-shaped rigid sleeve and is manufactured of the material being compatible with the pulping processes used for recycling the used newspapers at the paper mills and thereby eliminating contaminates which require labor and time to remove which reduces the value of the used newspapers that have been bundled wherein the circular-cylindrically-shaped mesh bag captures and bundles the used newspapers stacked in the replaceable and circular-cylindrically-shaped rigid sleeve when the replaceable and circular-cylindrically-shaped rigid sleeve is removed from both the generally circular-cylindrically-shaped container and the circular-cylindrically-shaped mesh bag which remains in the generally circular-cylindrically-shaped container with the used newspapers captured therein, by virtue of the weight of the used newspapers impacting on the circular-shaped bottom of the circular-cylindrically-shaped mesh bag, until the circular-cylindrically-shaped mesh bag with the used newspapers captured therein is removed, as the bundle, from the generally circular-cylindrically-shaped container without the need for using the ties to tie the used newspapers to form the bundle which is then disposed of for recycling.

In recent years, environmental concerns have resulted in an increased awareness of the need to recycle certain materials in order to save dwindling natural resources. One such material is paper, typically in the form of newspaper. In fact, many municipalities have recently instituted mandatory recycling programs which require that residents save and bundle their newspapers, which are then taken to a recycling center for processing.

Most purchasers of newspapers, however, when finished reading them, want to dispose of the papers in an easy, economical, and quick manner. The easiest and quickest way to handle and dispose of used newspapers is simply to throw them into the trash. This, however, is ecologically unsound since the papers aren't recycled if they are commingled with other trash. Also the papers quickly take up much of the available space in the trash bag or trash container.

Currently, to recycle newspapers, one must bundle and carry them to a recycling center, or, in a few communities, to a curbside for a collection by a recycler.

Typically, municipalities require that the residents bundle their newspapers in stacks, which bundles are then secured by, e.g. twine, paper tape, or the like. In order to comply with these requirements, many homeowners merely place their newspapers in a pile until the pile reaches the desired stack height. The pile of newspapers is then secured.

Users can bundle used newspapers manually, e.g. by taking a bundle of the desired size, wrapping string around the bundle, and tying the string. Most users, however, find this operation awkward and time consuming since they have to lift the bundle and manually position and wrap string around it several times, knot it, etc. i.e., the process is slow and cumbersome as a result of its manual nature. As a result, many users do not take the trouble to bundle their newspapers and therefore carry them out in loose, unbundled stacks which are difficult to handle. Also, this produces litter since individual papers often separate and sometimes blow away. Further, it is ecologically harmful since users often do not want to take the trouble to recycle their papers as they are difficult to handle.

For many people, such as the aged and physically handicapped, bundling is a difficult task, since a stack of newspaper weighs a considerable amount and is difficult to manipulate so as to put the twine or paper tape beneath the bundle during the securing process.

Furthermore, the traditional means for bundling papers, e.g. string, tape, shopping bags, wire, etc., are incompatible with the pulping process used for recycling newspapers at paper mills. Thus, such bundling means, from the point of view of the recycler, are contaminates which require labor and time to remove and therefore reducing the value of the collected paper.

Numerous innovations for paper bundling devices have been provided in the prior art that will be described. Even though these innovations may be suitable for the specific individual purposes to which they address, however, they differ from the present invention in that they do not teach a newspaper recycling disposal system that stacks and bundles used newspapers with a weight while eliminating the need for using ties to tie the used newspapers to form a bundle wherein the bundle is compatible with pulping processes used for recycling the used newspapers at paper mills, by virtue of elimination of the ties that are incompatible, and thereby eliminating contaminates which require labor and time to remove which reduces the value of the used newspapers that have been bundled. The system includes a generally circular-cylindrically-shaped container, a replaceable and circular-cylindrically-shaped rigid sleeve, and a circular-cylindrically-shaped mesh bag. The replaceable and circular-cylindrically-shaped rigid sleeve sits replaceably in the generally circular-cylindrically-shaped container and has the used newspapers stackable therein and has an open and circular-shaped top that forms an open mouth that receives the used newspapers. And, the circular-cylindrically-shaped mesh bag has a circular-shaped bottom and a circular-shaped and open top that forms a mouth that removably receives the replaceable and circular-cylindrically-shaped rigid sleeve and is manufactured of the material being compatible with the pulping processes used for recycling the used newspapers at the paper mills and thereby eliminating contaminates which require labor and time to remove which reduces the value of the used newspapers that have been bundled wherein the circular-cylindrically-shaped mesh bag captures and bundles the used newspapers stacked in the replaceable and circular-cylindrically-shaped rigid sleeve when the replaceable and circular-cylindrically-shaped rigid sleeve is removed from both the generally circular-cylindricallyshaped container and the circular-cylindrically-shaped mesh bag which remains in the generally circular-cylindrically-shaped container with the used newspapers captured therein, by virtue of the weight of the used newspapers impacting on the circular-shaped bottom of the circular-cylindrically-shaped mesh bag, until the circular-cylindrically-shaped mesh bag with the used newspapers captured therein is removed, as the bundle, from the generally circular-cylindrically-shaped container without the need for using the ties to tie the used newspapers to form the bundle which is then disposed of for recycling.

FOR EXAMPLE, U.S. Pat. No. Des. 247,207 to Moynihan teaches the ornamental design for a newspaper storing and bundling device.

ANOTHER EXAMPLE, U.S. Pat. No. 5,022,316 to Hellwig teaches a newspaper bundler that includes a rigid frame assembly for enabling newspapers to be easily stacked into a pile. The frame includes a U-shaped crosswise holder whose upstanding opposing side arms are made of sheet metal or plastic channels. A stack of paper bundling straps is positioned on the crosswise portion. The channels each have a pocket for holding fan-folded end portions of the stack of paper straps. One end portion of each strap is coated with adhesive so when the end portions of a strap are pulled from their pockets, they can be attached together around the pile of papers to securely bundle them so that they can be carried easily with one hand. The entire bundle is recyclable at a paper mill. In lieu of sheet metal side channels with pockets, the side pockets can be formed of tubular members bent and shaped to form pockets for the fan-folded ends of the straps. Also, the entire frame assembly can be a single, integral injection-molded piece of plastic.

STILL ANOTHER EXAMPLE, U.S. Pat. No. 5,042,371 to Katz teaches an apparatus for storing and bundling recyclable material. The apparatus includes rotatable containment members separated by a space, which support the recyclable material spanning the space. Rotation of the containment members allows bundling material lined up with the space to completely encircle the recyclable material without interference from the structure of the storage and bundling apparatus.

YET ANOTHER EXAMPLE, U.S. Pat. No. 5,129,526 to Craft, Jr. et al. teaches a container for stacking and bundling newspaper or the like. The container includes a rear wall and side walls defining an open front around which is a rim. The rear wall and the side walls extend upwardly from a bottom surface and are provided with windows therein. Front pedestals and rear pedestals are positioned at the front and rear of the side walls and have inclined upper newspaper supporting surfaces all lying the same plane. The bottom surface is provided with raised stop surfaces and inclined ramp surfaces to locate a ball of twine used to bundle the newspaper. The twine may be tied to rear wall through window and draped from back to front along bottom surface and may also be tied to one side wall through either window and draped from side to side along bottom surfaces so that newspaper resting on the pedestals may be readily bundled. A bag may also be positioned on the pedestals such that its open mouth extends generally upwardly through the open front of the container to receive the newspapers.

STILL YET ANOTHER EXAMPLE, U.S. Pat. No. 5,282,545 to White teaches a storage and disposal system for newspapers incorporating a storage cabinet approximating the dimensions of a standard newspaper having supports placed near the top inside walls of the cabinet to receive a liner. The liner comprises opposed preformed lengths of bundling material with ends designed to engage cabinet supports positioning the opened liner into the empty cabinet. After periodic deposits of newspapers that fill the storage cabinet to capacity, the added length of bundling material contained in the liner magazine are pulled out and used to complete the bundle closure without requiring the use of tools or complicated knots and removed the bundled contents of cabinet with ease.

FINALLY, YET STILL ANOTHER EXAMPLE, U.S. Pat. No. 5,388,687 to Philip teaches a packaging device for bundling papers to be recycled. The device includes a planar sheet of cardboard with an upper surface and a lower surface and formed of parallel sheets and a corrugated layer intermediate thereof. The cardboard is of a size and shape substantially that of a newspaper when folded. A paper cover in a rectangular configuration id slightly larger than that of the cardboard. The paper cover is adhered over the majority of its central extent to the lower surface of the cardboard and with peripheral edges folded over and adhesively adhered to the upper surface of the cardboard around the periphery thereof. Each side edge of the periphery is formed with a centrally located slot for the receipt of a tie string. A pair of tie strings that are positionable at right angles to each other and cross at the center point of the cardboard between the cardboard and the cover. The tie strings extend beyond the periphery of the cardboard and the cover to constitute tie strings positionable over a quantity of newspapers supported on the upper surface of the cardboard and the periphery.

It is apparent that numerous innovations for paper bundling devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT Of the present invention is to provide a newspaper recycling disposal system that avoids the disadvantages of the prior art.

ANOTHER OBJECT of the present invention is to provide a newspaper recycling disposal system that simple and inexpensive to manufacture.

STILL ANOTHER OBJECT of the present invention is to provide a newspaper recycling disposal system that is simple to use.

YET ANOTHER OBJECT of the present invention is to provide a newspaper recycling disposal system that stacks and bundles used newspapers while eliminating the need for using ties to tie the used newspapers to form bundles wherein the bundles are compatible with pulping processes used for recycling the used newspapers at paper mills, by virtue of eliminating the ties that are incompatible, and thereby eliminating contaminates which require labor and time to remove which reduces the value of the used newspapers that have been bundled.

BRIEFLY STATED, STILL YET ANOTHER OBJECT of the present invention is to provide a newspaper recycling disposal system that includes a generally circular-cylindrically-shaped container, a replaceable and circular-cylindrically-shaped rigid sleeve, and a circular-cylindrically-shaped mesh bag.

YET STILL ANOTHER OBJECT of the present invention is to provide a newspaper recycling disposal system wherein the generally circular-cylindrically-shaped container has a longitudinal axis, a circular-shaped and open top, and an outer surface.

STILL YET ANOTHER OBJECT of the present invention is to provide a newspaper recycling disposal system wherein the replaceable and circular-cylindrically-shaped rigid sleeve sits coaxially and replaceably in the generally circular-cylindrically-shaped container and has the used newspapers stackable therein.

YET STILL ANOTHER OBJECT of the present invention is to provide a newspaper recycling disposal system wherein the replaceable and circular-cylindrically-shaped rigid sleeve has an open and circular-shaped bottom and an open and circular-shaped top that forms an open mouth that receives the used newspapers being stacked in the replaceable and circular-cylindrically-shaped rigid sleeve.

STILL YET ANOTHER OBJECT of the present invention is to provide a newspaper recycling disposal system wherein the circular-cylindrically-shaped mesh bag has a circular-shaped bottom and a circular-shaped and open top that forms a mouth that coaxially and removably receives the replaceable and circular-cylindrically-shaped rigid sleeve while conforming snugly thereto and is coaxially and removably disposed in the generally circular-cylindrically-shaped container and further is manufactured of the material that is compatible with the pulping processes used for recycling the used newspapers at the paper mills and thereby eliminates the contaminates which require labor and time to remove which reduces the value of the used newspapers that have been bundled wherein the circular-cylindrically-shaped mesh bag captures and bundles the used newspapers stacked in the replaceable and circular-cylindrically-shaped rigid sleeve when the replaceable and circular-cylindrically-shaped rigid sleeve is removed from both the generally circular-cylindrically-shaped container and the circular-cylindrically-shaped mesh bag which remains in the generally circular-cylindrically-shaped container with the used newspapers captured therein until the circular-cylindrically-shaped mesh bag with the used newspapers captured therein is removed, as the bundle of the used newspapers, from the generally circular-cylindrically-shaped container without the need for using the ties to tie the used newspapers to form the bundle which is then disposed of for recycling.

YET STILL ANOTHER OBJECT of the present invention is to provide a newspaper recycling disposal system wherein the generally circular-cylindrically-shaped container further has a generally elliptically-shaped, flat, and horizontally-oriented base that is oriented obliquely to the longitudinal axis of the generally circular-cylindrically-shaped container so as to allow the generally circular-cylindrically-shaped to be inclined when rested on a horizontal surface and assist in stacking the used newspapers.

STILL YET ANOTHER OBJECT of the present invention is to provide a newspaper recycling disposal system wherein the generally circular-cylindrically-shaped container further has a circular-cylindrically-shaped internal chamber that extends coaxially therein from sightly above, and inclined to, the generally elliptically-shaped, flat, and horizontally-oriented base of the generally circular-cylindrically-shaped container to, and opening into, the circular-shaped and open top of the generally circular-cylindrically-shaped container.

YET STILL ANOTHER OBJECT of the present invention is to provide a newspaper recycling disposal system wherein the generally circular-cylindrically-shaped container further has an internal circumferential ledge that extends circumferentially around the circular-cylindrically-shaped internal chamber in the generally circular-cylindrically-shaped container, and is disposed slightly below, and parallel to, the circular-shaped and open top of the generally circular-cylindrically-shaped container.

STILL YET ANOTHER OBJECT of the present invention is to provide a newspaper recycling disposal system wherein the generally circular-cylindrically-shaped container further has a longitudinally-oriented pedestal that is fixedly attached to the outer surface of the generally circular-cylindrically-shaped container and extends vertically downwardly from the circular-shaped and open top of the generally circular-cylindrically-shaped container, perpendicularly to the generally elliptically-shaped, flat, and horizontally-oriented base of the generally circular-cylindrically-shaped container, and provides a wider footprint for better balance of the generally circular-cylindrically-shaped container so as to prevent the generally circular-cylindrically-shaped container from falling over as a result of its incline.

YET STILL ANOTHER OBJECT of the present invention is to provide a newspaper recycling disposal system wherein the longitudinally-oriented pedestal of the generally circular-cylindrically-shaped container has a recess therein that extends longitudinally therealong, from slightly above the generally elliptically-shaped, flat, and horizontally-oriented base of the generally circular-cylindrically-shaped container, and tapering upwardly therefrom, towards the circular-shaped and open top of the generally circular-cylindrically-shaped container, and provides a step for placement of a foot of a user so as to add stability when the circular-cylindrically-shaped mesh bag with the used newspapers captured therein are removed.

STILL YET ANOTHER OBJECT of the present invention is to provide a newspaper recycling disposal system wherein the generally circular-cylindrically-shaped container further has a hinge block that extends longitudinally along, and is fixedly attached to, the outer surface of the generally circular-cylindrically-shaped container, and which is disposed diametrically opposite to the longitudinally-oriented pedestal of the generally circular-cylindrically-shaped container.

YET STILL ANOTHER OBJECT of the present invention is to provide a newspaper recycling disposal system wherein the generally circular-cylindrically-shaped container further has a shallow and circular-cylindrically-shaped cover that is hingedly attached to the hinge block of the generally circular-cylindrically-shaped container, by a hinge pin, and which selectively opens and closes the circular-shaped and open top of the generally circular-cylindrically-shaped container.

STILL YET ANOTHER OBJECT of the present invention is to provide a newspaper recycling disposal system wherein the replaceable and circular-cylindrically-shaped rigid sleeve sits replaceably in, and substantially conforms to, the circular-cylindrically-shaped internal chamber in the generally circular-cylindrically-shaped container.

YET STILL ANOTHER OBJECT of the present invention is to provide a newspaper recycling disposal system wherein the replaceable and circular-cylindrically-shaped rigid sleeve further has a circumferentially-disposed and radially-outwardly-extending lip that extends circumferentially therearound, and radially outwardly therefrom, and is disposed below, and parallel to, the open and circular-shaped top of the replaceable and circular-cylindrically-shaped rigid sleeve.

STILL YET ANOTHER OBJECT of the present invention is to provide a newspaper recycling disposal system wherein the circumferentially-disposed and radially-outwardly-extending lip of the replaceable and circularcylindrically-shaped rigid sleeve rests on the internal circumferential ledge in the generally circular-cylindrically-shaped container, with the open and circular-shaped top of the replaceable and circular-cylindrically-shaped rigid sleeve extending slightly upwardly past the circular-shaped and open top of the generally circular-cylindrically-shaped container, when the replaceable and circular-cylindrically-shaped rigid sleeve is positioned in the generally circular-cylindrically-shaped container.

YET STILL ANOTHER OBJECT of the present invention is to provide a newspaper recycling disposal system wherein the hinge block of the generally circular-cylindrically-shaped container extends upwardly past the circular-shaped and open top of the generally circular-cylindrically-shaped container so as to allow the open and circular-shaped top of the replaceable and circular-cylindrically-shaped rigid sleeve to clear the shallow and circular-cylindrically-shaped cover of the generally circular-cylindrically-shaped container when the replaceable and circular-cylindrically-shaped rigid sleeve is positioned in the generally circular-cylindrically-shaped container and the shallow and circular-cylindrically-shaped cover is closed.

STILL YET ANOTHER OBJECT of the present invention is to provide a newspaper recycling disposal system wherein the replaceable and circular-cylindrically-shaped rigid sleeve further has a substantially C-shaped handle that is pivotally attached thereto, via a pair of diametrically-opposed handle mounting throughbores disposed therein, at a position between the open and circular-shaped top of the replaceable and circular-cylindrically-shaped rigid sleeve and the circumferentially-disposed and radially-outwardly-extending lip of the replaceable and circular-cylindrically-shaped rigid sleeve so as to allow the substantially C-shaped handle of the replaceable and circular-cylindrically-shaped rigid sleeve to be pivoted downwardly and not protrude past the open and circular-shaped top of the replaceable and circular-cylindrically-shaped rigid sleeve when the replaceable and circular-cylindrically-shaped rigid sleeve is positioned in the generally circular-cylindrically-shaped and container and the shallow and circular-cylindrically-shaped cover of the generally circular-cylindrically-shaped and container is closed.

YET STILL ANOTHER OBJECT of the present invention is to provide a newspaper recycling disposal system wherein the circular-shaped bottom of the circular-cylindrically-shaped mesh bag abuts against the open and circular-shaped bottom of the replaceable and circular-cylindrically-shaped rigid sleeve and the circular-shaped and open top of the circular-cylindrically-shaped mesh bag abuts against the circumferentially-disposed and radially-outwardly-extending lip of the replaceable and circular-cylindrically-shaped rigid sleeve when the replaceable and circular-cylindrically-shaped rigid sleeve is removably received in the circular-cylindrically-shaped mesh bag.

STILL YET ANOTHER OBJECT of the present invention is to provide a newspaper recycling disposal system wherein the circular-cylindrically-shaped mesh bag is recycled kraft so as to be compatible with the pulping processes used for recycling the used newspapers at paper mills, by virtue of eliminating the ties that are incompatible, and thereby eliminating contaminates which require labor and time to remove which reduces the value of the used newspapers that have been bundled.

FINALLY, YET STILL ANOTHER OBJECT of the present invention is to provide a method of using a newspaper recycling disposal system to stack and bundle used newspapers with a weight while eliminating need for using ties to tie the used newspapers to form a bundle wherein the bundle is compatible with pulping processes used for recycling the used newspapers at paper mills, by virtue of eliminating the ties that are incompatible, and thereby eliminating contaminates which require labor and time to remove which reduces the value of the used newspapers that have been bundled, the method comprising the steps of inserting a replaceable and circular-cylindrically-shaped rigid sleeve of the newspaper recycling disposal system through a circular-shaped and open top of a circular-cylindrically-shaped mesh bag of the newspaper recycling disposal system wherein the circular-cylindrically-shaped mesh bag is manufactured of the material being compatible with the pulping processes used for recycling the used newspapers at the paper mills and thereby eliminating contaminates which require labor and time to remove which reduces the value of the used newspapers that have been bundled; capturing the replaceable and circular-cylindrically-shaped rigid sleeve snugly and coaxially in the circular-cylindrically-shaped mesh bag; abutting a circular-shaped bottom of the circular-cylindrically-shaped mesh bag against an open and circular-shaped bottom of the replaceable and circular-cylindrically-shaped rigid sleeve; abutting the circular-shaped and open top of the circular-cylindrically-shaped mesh bag against a circumferentially-disposed and radially-outwardly-extending lip of the replaceable and circular-cylindrically-shaped rigid sleeve; inserting the replaceable and circular-cylindrically-shaped rigid sleeve through an open top of a generally circular-cylindrically-shaped and inclined container of the newspaper recycling disposal system; capturing the replaceable and circular-cylindrically-shaped rigid sleeve substantially conformingly and coaxially in a circular-cylindrically-shaped internal chamber in the generally circular-cylindrically-shaped and inclined container; resting the circumferentially-disposed and radially-outwardly-extending lip of the replaceable and circular-cylindrically-shaped rigid sleeve on a circumferential ledge in the circular-cylindrically-shaped internal chamber in the generally circular-cylindrically-shaped and inclined container; extending an open and circular-shaped top of the replaceable and circular-cylindrically-shaped rigid sleeve slightly upwardly past the open top of the generally circular-cylindrically-shaped and inclined container; inserting the used newspapers through the open and circular-shaped top of the replaceable and circular-cylindrically-shaped rigid sleeve; stacking the used newspapers in the replaceable and circular-cylindrically-shaped rigid sleeve, until the used newspapers being stacked are ready for disposal and recycling; grabbing a substantially C-shaped handle of the replaceable and circular-cylindrically-shaped rigid sleeve; inserting a foot of a user into a recess in a longitudinally-oriented pedestal of the generally circular-cylindrically-shaped and inclined container to add stability; removing the replaceable and circular-cylindrically-shaped rigid sleeve from both the generally circular-cylindrically-shaped and inclined container and the circular-cylindrically-shaped mesh bag; retaining the circular-cylindrically-shaped mesh bag with the used newspapers captured therein in the generally circular-cylindrically-shaped and inclined container, by virtue of the weight of the used newspapers impacting on the circular-shaped bottom of the circular-cylindrically-shaped mesh bag; grabbing the circular-shaped and open top of the circular-cylindrically-shaped mesh bag with the used newspapers captured therein; and, removing the circular-cylindrically-shaped mesh bag with the used newspapers captured therein from the circular-cylindrically-shaped internal chamber in the generally circular-cylindrically-shaped and inclined container, through the open top of the generally circular-cylindrically-shaped and inclined container.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING

| | |
|---|---|
| 10 | newspaper recycling disposal system of the present invention |
| 12 | generally circular-cylindrically-shaped and inclined container |
| 13 | container longitudinal axis |
| 14 | container generally elliptically-shaped, flat, and horizontally-oriented base |
| 16 | horizontal surface |
| 17 | container circular-shaped and open top |
| 18 | container circular-cylindrically-shaped internal chamber |
| 19 | container outer surface |
| 20 | container internal chamber circumferential ledge |
| 22 | container longitudinally-oriented pedestal |
| 24 | container pedestal recess |
| 26 | container hinge block |
| 28 | container shallow and circular-cylindrically-shaped cover |
| 30 | cover hinge pin |
| 32 | replaceable and circular-cylindrically-shaped rigid sleeve |
| 34 | sleeve open and circular-shaped bottom |
| 36 | sleeve open and circular-shaped top |
| 37 | newspapers |
| 38 | the sleeve circumferentially-disposed and radially-outwardly-extending lip |
| 40 | sleeve substantially C-shaped handle |
| 42 | sleeve pair of diametrically-opposed handle mounting throughbores |
| 44 | circular-cylindrically-shaped and mesh bag |
| 46 | bag circular-shaped bottom |
| 48 | bag circular-shaped and open top |

DETAILED DESCRIPTION OF THE PREFERRED EMBODIMENT

Referring now to the figures in which like numerals indicate like parts, the newspaper recycling disposal system of the present invention is shown generally at 10.

The configuration of the newspaper recycling disposal system 10 can best be seen in FIGS. 1-4, which are a diagrammatic perspective view of the present invention with the cover in the closed position, a partial cross sectional view of the present invention with the cover in the open position and with the sleeve and the bag, which captures the sleeve, being inserted into the container, an enlarged diagrammatic fragmented perspective view of the present invention with the cover in the open position and with newspapers stacked in the sleeve awaiting bundling and removal, and a diagrammatic fragmented side elevational view of the present invention with the cover in the open position and with the sleeve being removed from the container and causing the stacked newspapers to be captured and bundled in the bag that is being removed from the container, respectively, and as such will be discussed with reference thereto.

The newspaper recycling disposal system 10 includes a generally circular-cylindrically-shaped and inclined container 12 that has a container longitudinal axis 13 and a container generally elliptically-shaped, flat, and horizontally-oriented base 14 that is oriented obliquely to the container longitudinal axis 13 of the generally circular-cylindrically-shaped and inclined container 12 so as to allow the generally circular-cylindrically-shaped and inclined container 12 to be inclined when rested on a horizontal surface 16 and assist in stacking the used newspapers.

The generally circular-cylindrically-shaped and inclined container 12 further has a container circular-shaped and open top 17 and a container outer surface 19.

The generally circular-cylindrically-shaped and inclined container 12 further has a container circular-cylindrically-shaped internal chamber 18 that extends coaxially in the generally circular-cylindrically-shaped and inclined container 12, from sightly above, and inclined to, the container generally elliptically-shaped, flat, and horizontally-oriented base 14 of the generally circular-cylindrically-shaped and inclined container 12 to, and opening into, the container circular-shaped and open top 17 of the generally circular-cylindrically-shaped and inclined container 12.

The generally circular-cylindrically-shaped and inclined container 12 further has a container internal chamber circumferential ledge 20 that extends circumferentially around the container circular-cylindrically-shaped internal chamber 18 in the generally circular-cylindrically-shaped and inclined container 12, and is disposed slightly below, and parallel to, the container circular-shaped and open top 17 of the generally circular-circular-cylindrically-shaped and inclined container 12.

The generally circular-cylindrically-shaped and inclined container 12 further has a container longitudinally-oriented pedestal 22 that is fixedly attached to the container outer surface 19 of the generally circular-cylindrically-shaped and inclined container 12 and extends vertically downwardly from the container circular-shaped and open top 17 of the generally circular-cylindrically-shaped and inclined container 12 and perpendicularly to the container generally elliptically-shaped, flat, and horizontally-oriented base 14 of the generally circular-cylindrically-shaped and inclined container 12 and provides a wider footprint for better balance of the generally circular-cylindrically-shaped and inclined container 12 so as to prevent the generally circular-cylindrically-shaped and inclined container 12 from falling over as a result of its incline.

The container longitudinally-oriented pedestal 22 of the generally circular-cylindrically-shaped and inclined container 12 has a container pedestal recess 24 that extends longitudinally therealong, from slightly above the container generally elliptically-shaped, flat, and horizontally-oriented base 14 of the generally circular-cylindrically-shaped and inclined container 12 and tapering upwardly therefrom towards the container circular-shaped and open top 17 of the generally circular-cylindrically-shaped and inclined container 12 and provides a step for placement of a user foot (not shown) of a user (not shown) to add stability when bundled newspapers are removed.

The generally circular-cylindrically-shaped and inclined container 12 further has a container hinge block 26 that extends longitudinally along, and is fixedly attached to, the container outer surface 19 of the generally circular-cylindrically-shaped and inclined container 12, and which is disposed diametrically opposite to the container longitudinally-oriented pedestal 22 of the generally circular-cylindrically-shaped and inclined container 12.

The generally circular-cylindrically-shaped and inclined container 12 further has a container shallow and circular-cylindrically-shaped cover 28 that is hingedly attached to the container hinge block 26 of the generally circular-cylindrically-shaped and inclined container 12 by a cover hinge pin 30, and which selectively opens and closes the container circular-shaped and open top 17 of the generally circular-cylindrically-shaped and inclined container 12.

The newspaper recycling disposal system 10 further includes a replaceable and circular-cylindrically-shaped rigid sleeve 32 that sits coaxially and replaceably in, and substantially conforms to, the container circular-cylindrically-shaped internal chamber 18 in the generally circular-cylindrically-shaped and inclined container 12, and stacks used newspapers 37 therein.

The replaceable and circular-cylindrically-shaped rigid sleeve 32 has a sleeve open and circular-shaped bottom 34 and a sleeve open and circular-shaped top 36 that forms an open mouth for receiving the used newspapers 37 that are being stacked in the replaceable and circular-cylindrically-shaped rigid sleeve 32.

The replaceable and circular-cylindrically-shaped rigid sleeve 32 has a sleeve circumferentially-disposed and radially-outwardly-extending lip 38 that extends circumferentially around, and radially outwardly therefrom, and is disposed below, and parallel to, the sleeve open and circular-shaped top 36 of the replaceable and circular-cylindrically-shaped rigid sleeve 32.

The sleeve circumferentially-disposed and radially-outwardly-extending lip 38 of the replaceable and circular-cylindrically-shaped rigid sleeve 32 rests on the container internal chamber circumferential ledge 20 in the generally circular-cylindrically-shaped and inclined container 12, with the sleeve open and circular-shaped top 36 of the replaceable and circular-cylindrically-shaped rigid sleeve 32 extending slightly upwardly past the container open top 17 of the generally circular-cylindrically-shaped and inclined container 12, when the replaceable and circular-cylindrically-shaped rigid sleeve 32 is positioned in the generally circular-cylindrically-shaped and inclined container 12.

The container hinge block 26 of the generally circular-cylindrically-shaped and inclined container 12 extends upwardly past the container open top 17 of the generally circular-cylindrically-shaped and inclined container 12 so as to allow the sleeve open and circular-shaped top 36 of the replaceable and circular-cylindrically-shaped rigid sleeve 32 to clear the container shallow and circular-cylindrically-shaped cover 28 of the generally circular-cylindrically-shaped and inclined container 12 when the replaceable and circular-cylindrically-shaped rigid sleeve 32 is positioned in the generally circular-cylindrically-shaped and inclined container 12 and the container shallow and circular-cylindrically-shaped cover 28 is closed.

The replaceable and circular-cylindrically-shaped rigid sleeve 32 further has a sleeve substantially C-shaped handle 40 that is pivotally attached thereto, via a sleeve pair of diametrically-opposed handle mounting throughbores 42 that are disposed in the replaceable and circular-cylindrically-shaped rigid sleeve 32, at a position between the sleeve open and circular-shaped top 36 of the replaceable and circular-cylindrically-shaped rigid sleeve 32 and the sleeve circumferentially-disposed and radially-outwardly-extending lip of the replaceable and circular-cylindrically-shaped rigid sleeve 32 so as to allow the sleeve substantially C-shaped handle 40 of the replaceable and circular-cylindrically-shaped rigid sleeve 32 to be pivoted downwardly and not protrude past the sleeve open and circular-shaped top 36 of the replaceable and circular-cylindrically-shaped rigid sleeve 32 when the replaceable and circular-cylindrically-shaped rigid sleeve 32 is positioned in the generally circular-cylindrically-shaped and inclined container 12 and the container shallow and circular-cylindrically-shaped cover 28 is closed.

The newspaper recycling disposal system 10 further includes a circular-cylindrically-shaped mesh bag 44 that eliminates the need for tying the used newspapers 37, that have been stacked, to form bundles.

The circular-cylindrically-shaped mesh bag 44 is preferably recycled kraft so as to be compatible with pulping processes used for recycling used newspapers at paper mills, by virtue of eliminating ties that are incompatible, and thereby eliminating contaminates which require labor and time to remove which reduces the value of the used newspapers that have been bundled.

The circular-cylindrically-shaped mesh bag 44 is coaxially and removably disposed in the generally circular-cylindrically-shaped and inclined container 12 and is manufactured of a material that is compatible with pulping processes used for recycling the used newspapers 37 at paper mills so as to eliminate contaminates which require labor and time to remove and reduce the value of the used newspapers 37 that have been bundled.

The circular-cylindrically-shaped mesh bag 44 has a bag circular-shaped bottom 46 and a bag circular-shaped and open top 48 that forms a mouth for coaxially and removably receiving the replaceable and circular-cylindrically-shaped rigid sleeve 32.

The replaceable and circular-cylindrically-shaped rigid sleeve 32 is removably receivable by the circular-cylindrically-shaped mesh bag 44, which conforms snugly thereto.

The bag circular-shaped bottom 46 of the circular-cylindrically-shaped mesh bag 44 abuts against the sleeve open and circular-shaped bottom 34 of the replaceable and circular-cylindrically-shaped rigid sleeve 32 and the bag circular-shaped and open top 48 of the circular-cylindrically-shaped mesh bag 44 abuts against the sleeve circumferentially-disposed and radially-outwardly-extending lip 38 of the replaceable and circular-cylindrically-shaped rigid sleeve 32 when the replaceable and circular-cylindrically-shaped rigid sleeve 32 is removably received in the circular-cylindrically-shaped mesh bag 44.

The method of using the newspaper recycling disposal system 10 can best be seen in FIGS. 2–5, and as such will be discussed with reference thereto.

Figure 1:
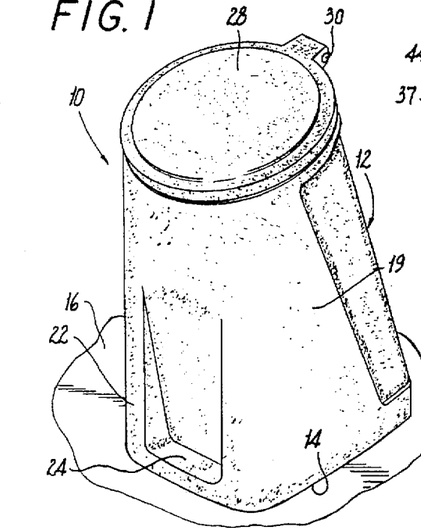
FIG. 1 is a diagrammatic perspective view of the present invention with the cover in the closed position.
Figures 2, 4:
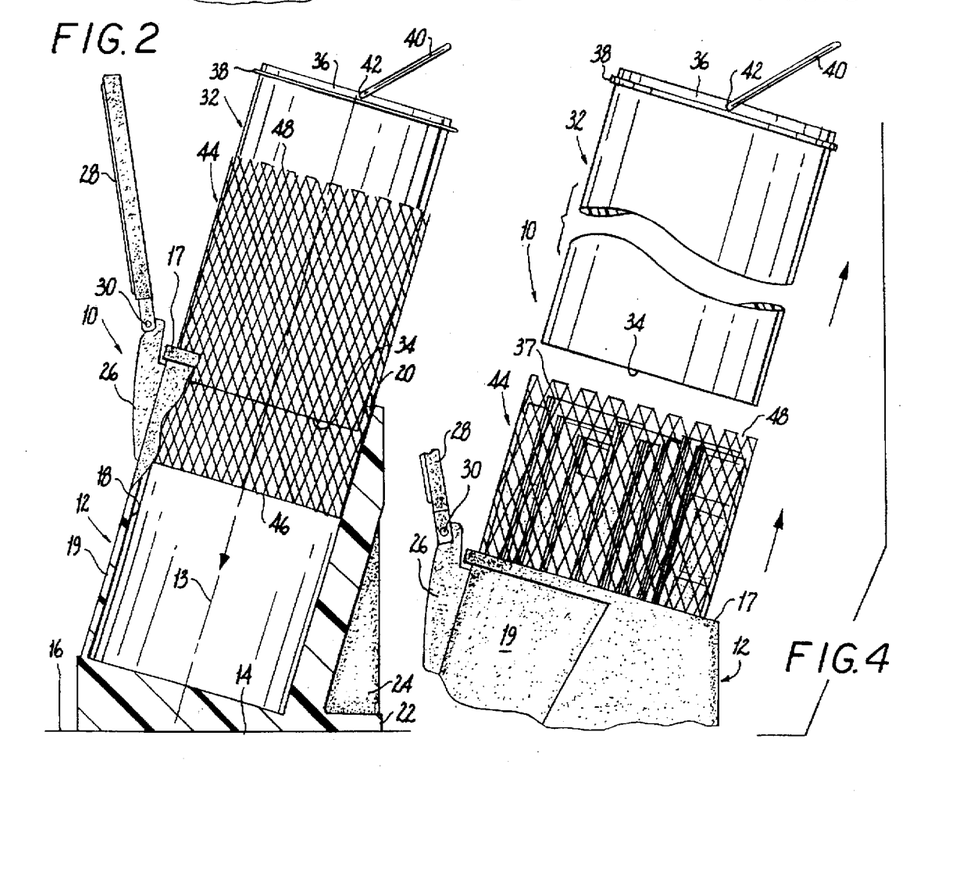
FIG. 2 is a partial cross sectional view of the present invention with the cover in the open position and with the sleeve and the bag, which captures the sleeve, being inserted into the container.
FIG. 4 is a diagrammatic fragmented side elevational view of the present invention with the cover in the open position and with the sleeve being removed from the container and causing the stacked newspapers to be captured and bundled in the bag that is being removed from the container.

Step 1: As shown in FIG. 2, which is a partial cross sectional view of the present invention with the cover in the open position and with the sleeve and the bag, which captures the sleeve, being inserted into the container, insert the replaceable and circular-cylindrically-shaped rigid sleeve 32 through the bag circular-shaped and open top 48 of the circular-cylindrically-shaped mesh bag 44 which is manufactured of the material being compatible with the pulping processes used for recycling the used newspapers at the paper mills and thereby eliminating contaminates which require labor and time to remove which reduces the value of the used newspapers that have been bundled.

STEP 2: Capture the replaceable and circular-cylindrically-shaped rigid sleeve 32 snugly and coaxially in the circular-cylindrically-shaped mesh bag 44.

STEP 3: Abut the bag circular-shaped bottom 46 of the circular-cylindrically-shaped mesh bag 44 against the sleeve open and circular-shaped bottom 34 of the replaceable and circular-cylindrically-shaped rigid sleeve 32.

STEP 4: Abut the bag circular-shaped and open top 48 of the circular-cylindrically-shaped mesh bag 44 against the sleeve circumferentially-disposed and radially-outwardly-extending lip 38 of the replaceable and circular-cylindrically-shaped rigid sleeve 32.

STEP 5: Insert the replaceable and circular-cylindrically-shaped rigid sleeve 32 through the container open top 17 of the generally circular-cylindrically-shaped and inclined container 12.

STEP 6: Capture the replaceable and circular-cylindrically-shaped rigid sleeve 32 substantially conformingly and coaxially in the container circular-cylindrically-shaped internal chamber 18 in the generally circular-cylindrically-shaped and inclined container 12.

STEP 7: Rest the sleeve circumferentially-disposed and radially-outwardly-extending lip 38 of the replaceable and circular-cylindrically-shaped rigid sleeve 32 on the container internal chamber circumferential ledge 20 in the generally circular-cylindrically-shaped and inclined container 12.

STEP 8: Extend the sleeve open and circular-shaped top 36 of the replaceable and circular-cylindrically-shaped rigid sleeve 32 slightly upwardly past the container open top 17 of the generally circular-cylindrically-shaped and inclined container 12.

Figures 3, 5:
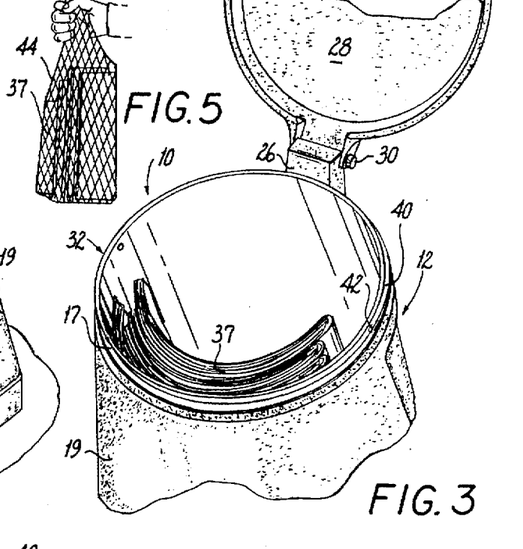
FIG. 3 is an enlarged diagrammatic fragmented perspective view of the present invention with the cover in the open position and with newspapers stacked in the sleeve awaiting bundling and removal.
FIG. 5 is a diagrammatic perspective view of the bag with the newspapers captured therein so as to be bundled and being held by a user and ready for recycling disposal.

STEP 9: As shown in FIG. 3, which is an enlarged diagrammatic fragmented perspective view of the present invention with the cover in the open position and with newspapers stacked in the sleeve awaiting bundling and removal, insert the used newspapers 37 through the sleeve open and circular-shaped top 36 of the replaceable and circular-cylindrically-shaped rigid sleeve 32.

STEP 10: Stack the used newspapers in the replaceable and circular-cylindrically-shaped rigid sleeve 32 until the used newspapers 37 being stacked are ready for disposal and recycling.

STEP 11: As shown in FIG. 4, which is a diagrammatic fragmented side elevational view of the present invention with the cover in the open position and with the sleeve being removed from the container and causing the stacked newspapers to be captured and bundled in the bag that is being removed from the container, grab the sleeve substantially C-shaped handle 40 of the replaceable and circular-cylindrically-shaped rigid sleeve 32.

STEP 12: Insert the user foot of the user into the container pedestal recess 24 in the container longitudinally-oriented pedestal 22 of the generally circular-cylindrically-shaped and inclined container 12 to add stability.

STEP 13: Remove the replaceable and circular-cylindrically-shaped rigid sleeve 32 from both the generally circular-cylindrically-shaped and inclined container 12 and the circular-cylindrically-shaped mesh bag 44.

STEP 14: Retain the circular-cylindrically-shaped mesh bag 44 with the used newspapers 37 captured therein in the generally circular-cylindrically-shaped and inclined container 12, by virtue of the weight of the used newspapers impacting on the bag circular-shaped bottom 46 of the circular-cylindrically-shaped mesh bag 44.

STEP 15: Grab the bag circular-shaped and open top 48 of the circular-cylindrically-shaped mesh bag 44 with the used newspapers 37 captured therein.

STEP 16: Remove the circular-cylindrically-shaped mesh bag 44 with the used newspapers 37 captured therein from the container circular-cylindrically-shaped internal chamber 18 in the generally circular-cylindrically-shaped and inclined container 12, through the through the container open top 17 of the generally circular-cylindrically-shaped and inclined container 12.

STEP 17: As shown in FIG. 5, which is a diagrammatic perspective view of the bag with the newspapers captured therein so as to be bundled and being held by a user and ready for recycling disposal, the circular-cylindrically-shaped mesh bag 44 with the used newspapers 37 captured therein forms the bundle without the need for using the ties to tie the used newspapers to form the bundle which is then ready for disposal and recycling.

It will be understood that each of the elements described above, or two or more together, may also find a useful application in other types of constructions differing from the types described above.

While the invention has been illustrated and described as embodied in a newspaper recycling disposal system, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A newspaper recycling disposal system that stacks and bundles used newspapers with a weight while eliminating need for using ties to tie the used newspapers to form a bundle wherein the bundle is compatible with pulping processes used for recycling the used newspapers at paper mills, by virtue of eliminating the ties that are incompatible, and thereby eliminating contaminates which require labor and time to remove which reduces value of the used newspapers that have been bundled, said system comprising:

a) a generally circular-cylindrically-shaped container having a longitudinal axis, a circular-shaped and open top, and an outer surface;

b) a replaceable and circular-cylindrically-shaped rigid sleeve sitting coaxially and replaceably in said generally circular-cylindrically-shaped container and having the used newspapers stackable therein; said replaceable and circular-cylindrically-shaped rigid sleeve having an open and circular-shaped bottom and an open and circular-shaped top forming an open mouth for receiving the used newspapers being stacked in said replaceable and circular-cylindrically-shaped rigid sleeve; and c) a circular-cylindrically-shaped mesh bag having a circular-shaped bottom and a circular-shaped and open top forming a mouth for removably receiving said replaceable and circular-cylindrically-shaped rigid sleeve and being manufactured of the material being compatible with the pulping processes used for recycling the used newspapers at the paper mills and thereby eliminating contaminates which require labor and time to remove which reduces the value of the used newspapers that have been bundled; said circular-cylindrically-shaped mesh bag capturing and bundling the used newspapers stacked in said replaceable and circular-cylindrically-shaped rigid sleeve when said replaceable and circular-cylindrically-shaped rigid sleeve is removed from both said generally circular-cylindrically-shaped container and said circular-cylindrically-shaped mesh bag which remains in said generally circular-cylindrically-shaped container with the used newspapers captured therein, by virtue of the weight of the used newspapers impacting on said circular-shaped bottom of said circular-cylindrically-shaped mesh bag, until said circular-cylindrically-shaped mesh bag with the used newspapers captured therein is removed, as the bundle, from said generally circular-cylindrically-shaped container without the need for using the ties to tie the used newspapers to form the bundle which is then disposed of for recycling.

2. The system as defined in claim 1, wherein said circular-cylindrically-shaped mesh bag is recycled kraft so as to be compatible with the pulping processes used for recycling the used newspapers at paper mills, by virtue of eliminating the ties that are incompatible, and thereby eliminating contaminates which require labor and time to remove which reduces the value of the used newspapers that have been bundled.

3. The system as defined in claim 1, wherein said generally circular-cylindrically-shaped container further has a generally elliptically-shaped, flat, and horizontally-oriented base that is oriented obliquely to said longitudinal axis of said generally circular-cylindrically-shaped container so as to allow said generally circular-cylindrically-shaped to be inclined when rested on a horizontal surface and assist in stacking the used newspapers.

4. The system as defined in claim 3, wherein said generally circular-cylindrically-shaped container further has a circular-cylindrically-shaped internal chamber that extends coaxially therein from sightly above, and inclined to, said generally elliptically-shaped, flat, and horizontally-oriented base of said generally circular-cylindrically-shaped container to, and opening into, said circular-shaped and open top of said generally circular-cylindrically-shaped container.

5. The system as defined in claim 4, wherein said generally circular-cylindrically-shaped container further has an internal circumferential ledge that extends circumferentially around said circular-cylindrically-shaped internal chamber in said generally circular-cylindrically-shaped container, and is disposed slightly below, and parallel to, said circular-shaped and open top of said generally circular-circular-cylindrically-shaped container.

6. The system as defined in claim 4, wherein said replaceable and circular-cylindrically-shaped rigid sleeve sits replaceably in, and substantially conforms to, said circular-cylindrically-shaped internal chamber in said generally circular-cylindrically-shaped container.

7. The system as defined in claim 3, wherein said generally circular-cylindrically-shaped container further has a longitudinally-oriented pedestal that is fixedly attached to said outer surface of said generally circular-cylindrically-shaped container and extends vertically downwardly from said circular-shaped and open top of said generally circular-cylindrically-shaped container, perpendicularly to said generally elliptically-shaped, flat, and horizontally-oriented base of said generally circular-cylindrically-shaped container, and provides a wider footprint for better balance of said generally circular-cylindrically-shaped container so as to prevent said generally circular-cylindrically-shaped container from falling over as a result of its incline.

8. The device as defined in claim 7, wherein said longitudinally-oriented pedestal of said generally circular-cylindrically-shaped container has a recess therein that extends longitudinally therealong, from slightly above said generally elliptically-shaped, flat, and horizontally-oriented base of said generally circular-cylindrically-shaped container, and tapering upwardly therefrom, towards said circular-shaped and open top of said generally circular-cylindrically-shaped container, and provides a step for placement of a foot of a user so as to add stability when the circular-cylindrically-shaped mesh bag with the used newspapers captured therein are removed.

9. The system as defined in claim 7, wherein said generally circular-cylindrically-shaped container further has a hinge block that extends longitudinally along, and is fixedly attached to, said outer surface of said generally circular-cylindrically-shaped container, and which is disposed diametrically opposite to said longitudinally-oriented pedestal of said generally circular-cylindrically-shaped container.

10. The system as defined in claim 9, wherein said generally circular-cylindrically-shaped container further has a shallow and circular-cylindrically-shaped cover that is hingedly attached to said hinge block of said generally circular-cylindrically-shaped container, by a hinge pin, and which selectively opens and closes said circular-shaped and open top of said generally circular-cylindrically-shaped container.

11. The system as defined in claim 10, wherein said hinge block of said generally circular-cylindrically-shaped container extends upwardly past said circular-shaped and open top of said generally circular-cylindrically-shaped container so as to allow said open and circular-shaped top of said replaceable and circular-cylindrically-shaped rigid sleeve to clear said shallow and circular-cylindrically-shaped cover of said generally circular-cylindrically-shaped container when said replaceable and circular-cylindrically-shaped rigid sleeve is positioned in said generally circular-cylindrically-shaped container and said shallow and circular-cylindrically-shaped cover is closed.

12. The system as defined in claim 10, wherein said replaceable and circular-cylindrically-shaped rigid sleeve further has a circumferentially-disposed and radially-outwardly-extending lip that extends circumferentially therearound, and radially outwardly therefrom, and is disposed below and parallel to, said open and circular-shaped top of said replaceable and circular-cylindrically-shaped rigid sleeve.

13. The system as defined in claim 12, wherein said circumferentially-disposed and radially-outwardly-extending lip of said replaceable and circular-cylindrically-shaped rigid sleeve rests on said internal circumferential ledge in said generally circular-cylindrically-shaped container, with said open and circular-shaped top of said replaceable and circular-cylindrically-shaped rigid sleeve extending slightly upwardly past said circular-shaped and open top of said generally circular-cylindrically-shaped container, when said replaceable and circular-cylindrically-shaped rigid sleeve is positioned in said generally circular-cylindrically-shaped container.

14. The system as defined in claim 12, wherein said replaceable and circular-cylindrically-shaped rigid sleeve further has a substantially C-shaped handle that is pivotally attached thereto, via a pair of diametrically-opposed handle mounting throughbores disposed therein, at a position between said open and circular-shaped top of said replaceable and circular-cylindrically-shaped rigid sleeve and said circumferentially-disposed and radially-outwardly-extending lip of said replaceable and circular-cylindrically-shaped rigid sleeve so as to allow said substantially C-shaped handle of said replaceable and circular-cylindrically-shaped rigid sleeve to be pivoted downwardly and not protrude past said open and circular-shaped top of said replaceable and circular-cylindrically-shaped rigid sleeve when said replaceable and circular-cylindrically-shaped rigid sleeve is positioned in said generally circular-cylindrically-shaped container and said shallow and circular-cylindrically-shaped cover of said generally circular-cylindrically-shaped container is closed.

15. The system as defined in claim 12, wherein said circular-shaped bottom of said circular-cylindrically-shaped mesh bag abuts against said open and circular-shaped bottom of said replaceable and circular-cylindrically-shaped rigid sleeve and said circular-shaped and open top of said circular-cylindrically-shaped mesh bag abuts against said circumferentially-disposed and radially-outwardly-extending lip of said replaceable and circular-cylindrically-shaped rigid sleeve when said replaceable and circular-cylindrically-shaped rigid sleeve is removably received in said circular-cylindrically-shaped mesh bag.

16. A method of using a newspaper recycling disposal system to stack and bundle used newspapers with a weight while eliminating need for using ties to tie the used newspapers to form a bundle wherein the bundle is compatible with pulping processes used for recycling the used newspapers at paper mills, by virtue of eliminating the ties that are incompatible, and thereby eliminating contaminates which require labor and time to remove which reduces the value of the used newspapers that have been bundled, said method comprising the steps of:

a) inserting a replaceable and circular-cylindrically-shaped rigid sleeve of said newspaper recycling disposal system through a circular-shaped and open top of a circular-cylindrically-shaped mesh bag of said newspaper recycling disposal system wherein said circular-cylindrically-shaped mesh bag is manufactured of the material being compatible with the pulping processes used for recycling the used newspapers at the paper mills and thereby eliminating contaminates which require labor and time to remove which reduces the value of the used newspapers that have been bundled;

b) capturing said replaceable and circular-cylindrically-shaped rigid sleeve snugly and coaxially in said circular-cylindrically-shaped mesh bag;

c) abutting a circular-shaped bottom of said circular-cylindrically-shaped mesh bag against an open and circular-shaped bottom of said replaceable and circular-cylindrically-shaped rigid sleeve;

d) abutting said circular-shaped and open top of said circular-cylindrically-shaped mesh bag against a circumferentially-disposed and radially-outwardly-extending lip of said replaceable and circular-cylindrically-shaped rigid sleeve;

e) inserting said replaceable and circular-cylindrically-shaped rigid sleeve through an open top of a generally circular-cylindrically-shaped and inclined container of said newspaper recycling disposal system;

f) capturing said replaceable and circular-cylindrically-shaped rigid sleeve substantially conformingly and coaxially in a circular-cylindrically-shaped internal chamber in said generally circular-cylindrically-shaped and inclined container;

g) resting said circumferentially-disposed and radially-outwardly-extending lip of said replaceable and circular-cylindrically-shaped rigid sleeve on a circumferential ledge in said circular-cylindrically-shaped internal chamber in said generally circular-cylindrically-shaped and inclined container;

h) extending an open and circular-shaped top of said replaceable and circular-cylindrically-shaped rigid sleeve slightly upwardly past said open top of said generally circular-cylindrically-shaped and inclined container;

i) inserting the used newspapers through said open and circular-shaped top of said replaceable and circular-cylindrically-shaped rigid sleeve;

j) stacking the used newspapers in said replaceable and circular-cylindrically-shaped rigid sleeve, until the used newspapers being stacked are ready for disposal and recycling;

k) grabbing a substantially C-shaped handle of said replaceable and circular-cylindrically-shaped rigid sleeve;

l) inserting a foot of a user into a recess in a longitudinally-oriented pedestal of said generally circular-cylindrically-shaped and inclined container to add stability;

m) removing said replaceable and circular-cylindrically-shaped rigid sleeve from both said generally circular-cylindrically-shaped and inclined container and said circular-cylindrically-shaped mesh bag;

n) retaining said circular-cylindrically-shaped mesh bag with the used newspapers captured therein in said generally circular-cylindrically-shaped and inclined container, by virtue of the weight of the used newspapers impacting on said circular-shaped bottom of said circular-cylindrically-shaped mesh bag;

o) grabbing said circular-shaped and open top of said circular-cylindrically-shaped mesh bag with the used newspapers captured therein; and p) removing said circular-cylindrically-shaped mesh bag with the used newspapers captured therein from said circular-cylindrically-shaped internal chamber in said generally circular-cylindrically-shaped and inclined container, through said open top of said generally circular-cylindrically-shaped and inclined container.

17. A method of stacking and bundling used newspapers with a weight while eliminating need for using ties to tie the used newspapers to form a bundle wherein the bundle is compatible with pulping processes used for recycling the used newspapers at paper mills, by virtue of eliminating the ties that are incompatible, and thereby eliminating contaminates which require labor and time to remove which reduces value of the used newspapers that have been bundled, comprising the step of stacking and bundling the used newspapers in a newspaper recycling disposal system which comprises:

a) a generally circular-cylindrically-shaped container having a longitudinal axis, a circular-shaped and open top, and an outer surface;

b) a replaceable and circular-cylindrically-shaped rigid sleeve sitting coaxially and replaceably in said generally circular-cylindrically-shaped container and having the used newspapers stackable therein; said replaceable and circular-cylindrically-shaped rigid sleeve having an open and circular-shaped bottom and an open and circular-shaped top forming an open mouth for receiving the used newspapers being stacked in said replaceable and circular-cylindrically-shaped rigid sleeve; and c) a circular-cylindrically-shaped mesh bag having a circular-shaped bottom and a circular-shaped and open top forming a mouth for removably receiving said replaceable and circular-cylindrically-shaped rigid sleeve and being manufactured of the material being compatible with the pulping processes used for recycling the used newspapers at the paper mills and thereby eliminating contaminates which require labor and time to remove which reduces the value of the used newspapers that have been bundled; said circular-cylindrically-shaped mesh bag capturing and bundling the used newspapers stacked in said replaceable and circular-cylindrically-shaped rigid sleeve when said replaceable and circular-cylindrically-shaped rigid sleeve is removed from both said generally circular-cylindrically-shaped container and said circular-cylindrically-shaped mesh bag which remains in said generally circular-cylindrically-shaped container with the used newspapers captured therein, by virtue of the weight of the used newspapers impacting on said circular-shaped bottom of said circular-cylindrically-shaped mesh bag, until said circular-cylindrically-shaped mesh bag with the used newspapers captured therein is removed, as the bundle, from said generally circular-cylindrically-shaped container without the need for using the ties to tie the used newspapers to form the bundle which is then disposed of for recycling.

* * * * *